April 24, 1928.
A. E. RAINEY
SCOOTER SLED
Filed March 23, 1927
1,667,436
2 Sheets-Sheet 1
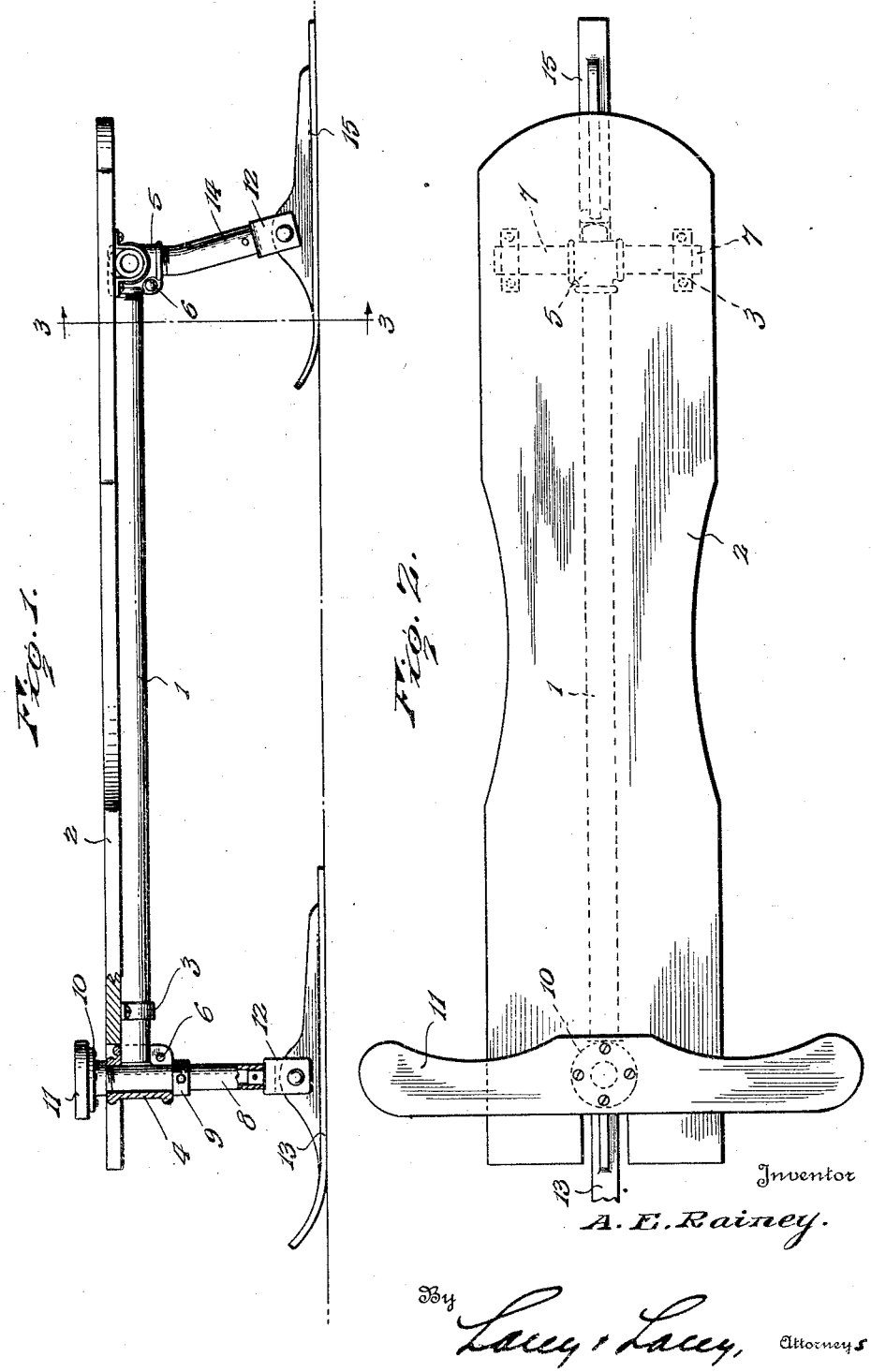

April 24, 1928.
A. E. RAINEY
1,667,436
SCOOTER SLED
Filed March 23, 1927      2 Sheets-Sheet 2
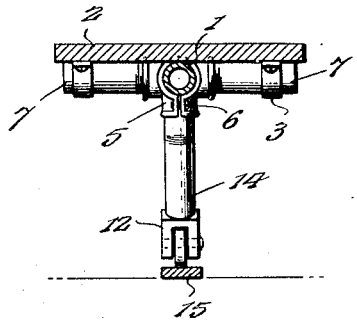
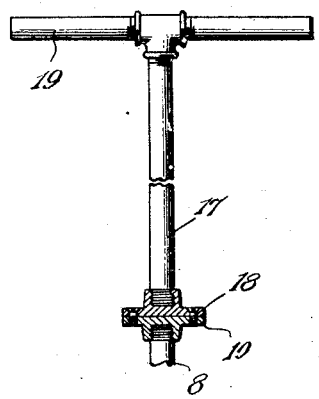
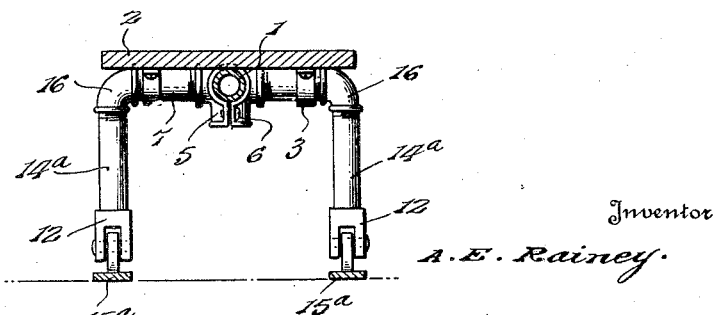
Inventor
A. E. Rainey.
By Lacey & Lacey, Attorneys Patented Apr. 24, 1928.

1,667,436

UNITED STATES PATENT OFFICE.

AUSTIN E. RAINEY, OF GROVE CITY, PENNSYLVANIA.

SCOOTER SLED.

Application filed March 23, 1927. Serial No. 177,786.

The invention provides a coaster sled which may be equipped with two or three runners as desired and adapted so that the user may lie, sit or stand upon the platform and steer the device in either position.

The invention provides an article of the nature stated which is substantial, light, and efficient and which admits of ready adaptation of the sled to meet specific requirements for steering and the utilization of two or three runners.

While the drawings illustrate a preferred embodiment of the invention it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which, Figure 1 is a side view of a coaster sled embodying the invention, parts being broken away.

Figure 2 is a top plan view of the sled.

Figure 3 is a vertical, transverse sectional view on the line 3—3 of Figure 1, looking towards the rear, as indicated by the arrows.

Figure 4 is a side view of the front portion of the sled having an extension post coupled to the steering post.

Figure 5 is a front view of the extension post and a part of the steering post to which it is coupled, the connecting means being in section.

Figure 6 is a view similar to Figure 3, showing the single rear runner replaced by two runners.

Corresponding and like parts are referred to in the following description and designated in the several views of the drawings by like reference characters.

The numeral 1 designates a straight reach bar to which a platform 2 is secured by means of clips 3, or other preferred way. A fitting or cluster 4 is coupled to the front end of the reach bar 1 and a similar cluster 5 is connected to the rear end of said reach bar. These clusters or fittings may be split and the portions bordering upon the split drawn together by means of a bolt 6. Short bars 7 are coupled to the lateral branches of the fitting or cluster 5 and provide a firm support for the platform 1 as well as means for connecting two rear runners, when it is desired to equip the sled with three runners, one in front and two in the rear, as indicated most clearly in Figure 6. The steering post 8 is loosely mounted in the vertical branch of the fitting or cluster 4 and has a stop collar 9 secured thereon to engage the lower end of the fitting 4 and prevent downward movement of the reach bar 1 and platform 2. A circular plate 10 is secured to the upper projecting end of the steering post 8 and receives a cross bar 11 which is connected thereto and provides convenient means for steering either by means of the feet or hands according to the position of the rider. The cross bar 11 projects beyond opposite sides of the platform 1 to be conveniently engaged by the feet when the rider is sitting upon the platform, or to be gripped by the hands when the rider is prone or lying upon the platform. A fork 12 is fitted to the lower end of the steering post 8 and receives the front runner 13 which is pivoted thereto intermediate its ends.

A post 14 is coupled to the vertical branch of the rear cluster 5 and has a fork 12 fitted to its lower end to receive the rear runner 15 which is pivoted thereto intermediate its ends. When it is desired to equip the thread with two rear runners, as indicated in Figure 6 the post 14 and runner 15 are removed and replaced by posts 14$^a$ and runners 15$^a$, the posts 14$^a$ being connected to the outer ends of the bars 7 by means of L-fittings 16.

To admit of the user steering the sled when standing thereon an extension post 17 is provided. A plate 18, similar to the plate 10, is connected to the lower end of the extension post 17, and this plate 18 is connected to the plate 10, as indicated most clearly in Figures 4 and 5. Handle bars 19 are fitted to the upper end of the extension post 17. Preliminary to coupling the extension post to the steering post 8, the cross bar 11 is removed. The plate 10 functions as a stop to prevent displacement of the steering post, besides providing means for attachment of the cross bar 11 or extension post thereto.

Having thus described the invention, I claim:

1. A coaster sled comprising a reach bar, a cluster fitting at each end of the reach bar, short bars coupled to the rear fitting and projecting laterally therefrom in opposite directions, a platform secured to the reach bar and engaging the rear cross bars, a steering post mounted in the front fitting, a steering member coupled to the upper end of the steering post, a rear post coupled to the rear fitting, and runners at the lower ends of the steering and rear posts.

2. A coaster sled comprising a reach bar, similar cluster fittings at opposite ends of the reach bar, cross bars coupled to the rear fitting and projecting laterally therefrom in opposite directions, a steering post loosely mounted in the front fitting, a stop carried by the steering post to engage the lower end of the fitting, a plate coupled to the upper end of the steering post, and acting jointly with the stop to retain the steering post in proper position, a platform supported upon the reach bar and the rear cross bars and connected thereto, steering means connected to the plate at the upper end of the steering post, a rear post adapted to be coupled to the rear fitting or the outer end of a rear cross bar, and front and rear runners at the lower ends of the front and rear posts.

In testimony whereof I affix my signature.

AUSTIN E. RAINEY. [L. S.]